US008307098B1

(12) United States Patent
Atkins et al.

(10) Patent No.: US 8,307,098 B1
(45) Date of Patent: Nov. 6, 2012

(54) SYSTEM, METHOD, AND PROGRAM FOR MANAGING A USER KEY USED TO SIGN A MESSAGE FOR A DATA PROCESSING SYSTEM

(75) Inventors: Barry Atkins, Raleigh, NC (US); David Carroll Challener, Raleigh, NC (US); Frank Novak, Raleigh, NC (US); Joseph Gary Rusnak, Durham, NC (US); Kenneth D. Timmons, Raleigh, NC (US); William W. Vetter, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 3849 days.

(21) Appl. No.: 09/651,548

(22) Filed: Aug. 29, 2000

(51) Int. Cl.
*G06F 15/16* (2006.01)
(52) U.S. Cl. ........ 709/229; 380/273; 380/277; 713/167; 713/183
(58) Field of Classification Search ........... 380/277, 380/25, 30, 281, 273; 713/193, 189, 200, 713/156, 191, 167, 183; 709/229
See application file for complete search history.

(56) References Cited

U.S. PATENT DOCUMENTS 4,888,800 A * 12/1989 Marshall et al. ............. 380/281
(Continued)

FOREIGN PATENT DOCUMENTS
EP 1030282 8/2000
(Continued)

OTHER PUBLICATIONS

European Patent Application No. EP1185024 A2: System, Method, and Program for Managing a User Key used to Sign a Message for a Data Processing System. Publication date: Mar. 6, 2002.*

(Continued)

*Primary Examiner* — Kyung H Shin
(74) *Attorney, Agent, or Firm* — Antony P. Ng; Yudell Isidore Ng Russell PLLC (57) ABSTRACT

A system, method, and program for managing a user key used to sign a message for a data processing system having an encryption chip are disclosed. A user is assigned a user key. In order to encrypt and send messages to a recipient(s), the messages are encrypted with the user key. The user key, in turn, is encrypted with an associated key. The associated key is further encrypted using an encryption chip key stored on the encryption chip. The encrypted messages are communicated to a recipient to validate an association of the user with the encrypted messages. The associated key is decrypted with the encryption chip key. The user key is decrypted with the associated key, and the messages are decrypted with the user key. Thereafter, validation of the association of messages with the user is removed by revoking the associated key. In a preferred embodiment, encryption resources are centralized in a server system having the encryption chip. The server system is coupled to and provides encryption services to a plurality of client systems. Messages to be encrypted are sent from a user's client system to the server system, which encrypts the messages using the encryption chip. The encrypted messages are sent from the server system to the client system, which then transmits the encrypted messages to their intended recipient(s). All data relating to the encrypted messages are erased from the server system after the encrypted messages are sent from the server system to the client system.

24 Claims, 4 Drawing Sheets

U.S. PATENT DOCUMENTS

| | | | | |
|---|---|---|---|---|
| 5,519,778 A * | 5/1996 | Leighton et al. | ................ | 380/30 |
| 5,666,416 A | 9/1997 | Micali | | |
| 5,745,573 A * | 4/1998 | Lipner et al. | .................. | 380/286 |
| 6,009,177 A * | 12/1999 | Sudia | ............................ | 713/191 |
| 6,336,186 B1 * | 1/2002 | Dyksterhouse et al. | ....... | 713/156 |
| 6,400,823 B1 * | 6/2002 | Angelo | ......................... | 380/255 |
| 6,487,658 B1 * | 11/2002 | Micali | ........................... | 713/158 |
| 6,704,868 B1 * | 3/2004 | Challener et al. | .............. | 713/168 |
| 6,732,101 B1 * | 5/2004 | Cook | ............................... | 707/10 |
| 6,760,752 B1 * | 7/2004 | Liu et al. | ........................ | 709/206 |
| 6,807,277 B1 * | 10/2004 | Doonan et al. | ................ | 380/281 |

FOREIGN PATENT DOCUMENTS

| | | |
|---|---|---|
| GB | 2318486 | 4/1998 |

OTHER PUBLICATIONS

RSA, http://searchsecurity.techtarget.com/sDefinition/0,,sid14_gci214273,00.html.*

"A Survey of Public Key Infrastructures," PKI Survey—Cryptography Basics, Chapter 2, http://HOME.XCERT.COM/~MARCNARC/PKI/THESIS/BASICS.HTML, pp. 1-4.

"A Survey of Public Key Infrastructures," PKI Survey—PKI Characteristics, Chapter 3, http://HOME.XCERT.COM/~MARCNARC/PKI/THESIS/CHARACTERISTICS.HTML, pp. 1-10.

RSA (Rivest-Shamir-Adleman), http://WWW.WHATIS.COM/RSA.HTM, 1 Page.

* cited by examiner

SYSTEM, METHOD, AND PROGRAM FOR MANAGING A USER KEY USED TO SIGN A MESSAGE FOR A DATA PROCESSING SYSTEM

BACKGROUND OF THE INVENTION

1. Technical Field

The present invention relates in general to data processing, and, in particular, to a system, method, and program for providing data security. Still more particularly, the present invention relates to a system, method, and program for managing a user key used to sign a message for a data processing system.

2. Description of the Related Art

Cryptography involves encrypting data to provide security for the data. For example, before transmission of a message from one party to another, the message may be encrypted using a mathematical function known as a cryptographic algorithm. The most common cryptographic algorithms are key-based, where special knowledge of variable information called a "key" is required to decrypt an encrypted message. Two prevalent types of key-based cryptographic algorithms exist, namely, symmetric key (or secret key) algorithms and public key (asymmetric key) algorithms. The security provided by these cryptographic algorithms is centered around the keys and not the details of the cryptographic algorithms. In other words, the cryptographic algorithms can typically be known to all, but the keys can only be known by authorized parties. As a result, the cryptographic algorithm may be published for public scrutiny and then mass produced for incorporation into security products.

In most symmetric key algorithms, the encryption key and the decryption key are the same secret key. The sender and recipient of a message must be able to exchange information regarding the secret key, and each party must trust the other not to disclose the secret key. The sender must communicate the key through another relatively secure communication path. With public key algorithms, the key used for encryption is different from the key used for decryption. The decryption key is difficult to calculate from an encryption key. In a typical operation, the public key used for encryption is made public via a readily accessible directory, while the corresponding private key used for decryption is known only to the recipient of the encrypted message. In an exemplary public key transaction, a sender retrieves the recipient's public key and uses it to sign the message prior to sending the message. The recipient then receives and decrypts the encrypted message with the corresponding private key. Encrypting a message using a private key and decrypting the encrypted message using a public key, which is sometimes used in digital signatures to authenticate the source of a message, are possible.

One of the more popular public key algorithms is RSA (named after its inventors Rivest, Shamir, and Adleman). With RSA, when a message is encrypted utilizing a user public key, the encrypted message may only be decrypted utilizing a user private key. In one implementation, each user private key is also associated with a password, and both are enclosed within an individual secure wrapper. All user private keys along with their respective passwords are stored in a protected storage area within an encryption/decryption device, such as an encryption chip. In order to allow the encryption chip to perform an authentication procedure, such as signing signatures, a user must provide a correct password to the encryption chip. For security purposes, copies of any user private key must not exist outside the secure wrapper. Thus, a user private key and its respective password can only be unwrapped inside the encryption chip, leaving no opportunity for the password to be changed.

Public-private key cryptography allows messages to be digitally signed. A sender may publish his decryption key as a public key and maintain his encryption key secret as a private key. If the sender encrypts a message using the private key, then anyone receiving the message is able to decrypt the message using the sender's public key. In doing so, the recipients are able to verify that the message was encrypted by the sender since he is the sole possessor of the private key. The sender has, in effect, digitally signed the message. An alternative way of digitally signing a message involves the use of a hashing function, which is also known as a "message digest" or "fingerprint" algorithm. A message is hashed using a cryptographic hash function. The cryptographic hash function maps an arbitrary-length message to a fixed number of bits. The hashed message or hash is then encrypted. Digitally signing a message using the hashing function is generally a two-step process. The first step involves hashing the message and encrypting the hashed message using a private key. The message is transmitted along with the encrypted hash from the sender to the recipient. The second step involves the verification of the signature. The recipient hashes the received message, decrypts the received, encrypted hash with the associated public key and compares the pair of hashed values. The signature is valid if the two hashed values match. Otherwise, the message was somehow altered during transmission.

Certification is the process of binding a key, such as a public key or private key, to an individual, organization, entity, or piece of information, such as a permission or credential. A certificate is a collection of information that has been digitally signed by a certificate issuer. The certificate issuer is a party who issues a key to a person, organization, entity, or piece of information and manages the validity of the issued key. If a user is no longer permitted to use a key, the certificate issuer needs to revoke the certificate for the user's key by publishing the certificate for the key on a certificate revocation list ("CRL"). However, a time gap typically exists between when a certificate issuer receives a notification that a certificate for a key should be revoked and when the certificate issuer publishes the certificate of the key on the next CRL. This time gap results in what is known as the CRL time-granularity problem. During this time period, the user may attempt to use the key to engage in unauthorized transactions and communications that should have been invalidated by the revocation of the key and the certificate for the key. The user may then continue to sign messages and communicate without proper authority. The present invention recognizes the need and desire to resolve this problem.

SUMMARY OF THE INVENTION

A system, method, and program for managing a user key used to sign a message for a data processing system having an encryption chip are disclosed. A user is assigned a user key. In order to encrypt and send messages to a recipient(s), the messages are encrypted with the user key. The user key, in turn, is encrypted with an associated key. The associated key is further encrypted using an encryption chip key stored on the encryption chip. The encrypted messages are communicated to a recipient to validate an association of the user with the encrypted messages. The associated key is decrypted with the encryption chip key. The user key is decrypted with the associated key, and the messages are decrypted with the user key. Thereafter, validation of the association of messages with the user is removed by revoking the associated key.

In a preferred embodiment, encryption resources are centralized in a server system having the encryption chip. The server system is coupled to and provides encryption services to a plurality of client systems. Messages to be encrypted are sent from a user's client system to the server system, which encrypts the messages using the encryption chip. The encrypted messages are sent from the server system to the client system, which then transmits the encrypted messages to their intended recipient(s). All data relating to the encrypted messages are erased from the server system after the encrypted messages are sent from the server system to the client system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

In conventional computer systems, encryption/decryption of messages are performed utilizing an internal encryption chip that stores both the encryption/decryption algorithms and a key or key pair used by the encryption chip to encrypt and decrypt data. In a network environment each computer's encryption chip performs the same basic encryption/decryption functions, which invites the consolidation of the encryption/decryption function at a centralized location in order to reduce expense and management and enhance physical security.

However, centralization of encryption and decryption services at an encryption server can lead to various problems. One problem is that very secure communication must be established between each client system and encryption the server. Otherwise, unauthorized persons may gain illicit entry to and illegally decrypt encrypted data communicated between the client systems and the encryption server. Another problem that arises is a difficulty in key management. A client system is assigned a key that is provided to the user of that client system. Various keys for various client systems are used and managed by the single encryption server. However, if the issued key for a particular client system needs to be revoked, the user may maintain a copy of the revoked key and thereby gain unlawful access to encrypted data by simply logging into the encryption server from a remote client system. The present invention consolidates the encryption/decryption operations of data to a centralized location while avoiding the problems associated with centralizing the encryption/decryption operations.

Figure 1:
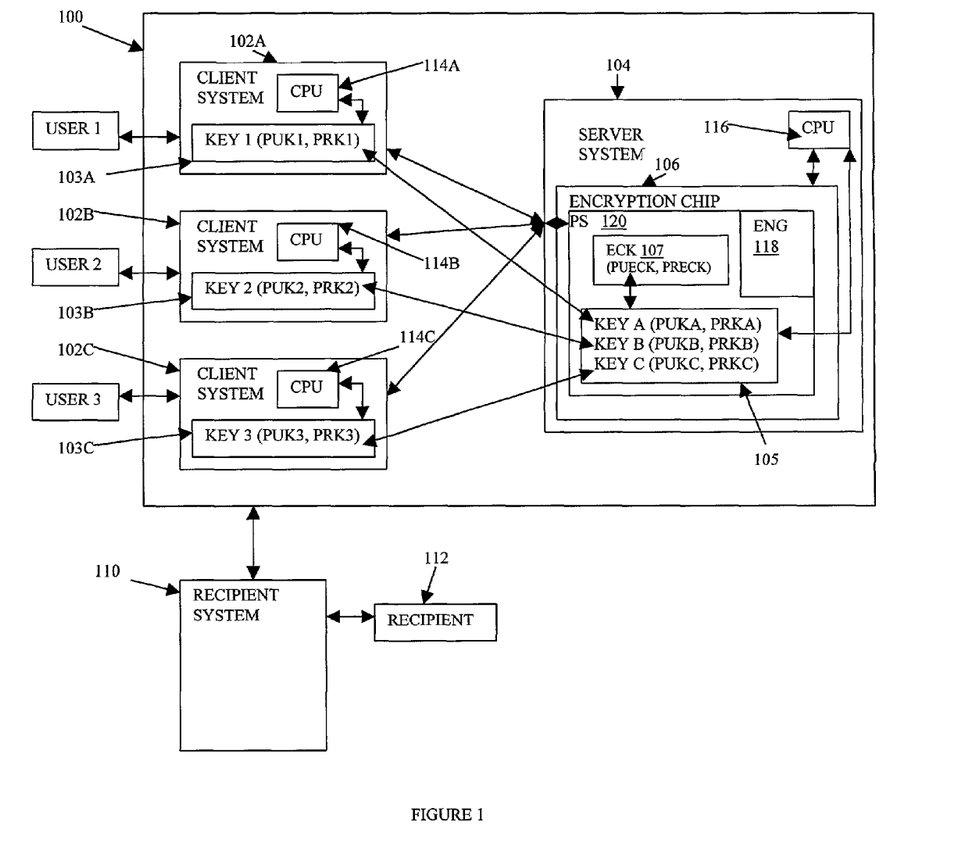
FIG. 1 is an exemplary block diagram of a data processing system that implements the present invention.

With reference now to FIG. 1, an exemplary block diagram of a data processing system 100 that implements the present invention is shown. Data processing system 100 includes client systems 102A, 102B, and 102C coupled in communication with a server system 104. Communication between client systems 102A, 102B, and 102C and server system 104 is conducted via a secure communication link, such as a Secure Sockets Layer ("SSL") connection. SSL is a standard developed by Netscape Communications for establishing secure communication channels between devices to avoid interception and unauthorized access of critical or sensitive data. Client system 102A has a memory system 103A and a central processing unit (CPU) 114A, which are coupled to each other. Similarly, client system 102B includes a memory system 103B and a CPU 114B, and client system 102C contains a memory system 103C and a CPU 114C. User 1 uses client system 102A, and user 2 utilizes client system 102B. Furthermore, user 3 uses client system 102C. The term "user" is understood to mean a person, a service, an application, a device, or any other entity that may access an application. The term "user" is not limited to a human user.

Server system 104 has a memory device 105 and a CPU 116, which are coupled to each other as well. Server system 104 further includes an encryption chip 106. Encryption chip 106, which is coupled in communication with CPU 116 and memory device 105, contains an encryption/decryption engine ("ENG") 118 and a protected storage ("PS") area 120. Encryption/decryption engine 118 implements an encryption/decryption algorithm that encodes and decodes messages transmitted and received by client systems 102A, 102B, and 102C, in accordance with the present invention.

In FIG. 1, users 1, 2, and 3 utilize data processing system 100 to encrypt messages, such as to sign messages, that are then electronically transmitted to a recipient 112 through a recipient system 110. The present invention preferably implements a public/private key encryption and decryption scheme. Key 1, which includes a public key 1 ("PUK1") and a private key 1 ("PRK1"), is a user key assigned to user 1. Key 1 is stored in memory system 103A. Also, key 2, which includes a public key 2 ("PUK2") and a private key 2 ("PRK2"), is issued as the user key for user 2, and key 2 is stored in memory system 103B. Additionally, key 3, which includes a public key 3 ("PUK3") and a private key 3 ("PRK3"), is assigned as the user key for user 3. Key 3 is stored in memory system 103C. When data processing system 100 performs encryption/decryption operations, keys 1, 2, and/or 3 are sent to protected storage area 120 of server system 104.

Protected storage area 120 may be implemented with an electronically erasable storage device. Protected storage area 120 encompasses memory device 105 and an encryption chip key 107 ("ECK"). Protected storage area 120 stores the user public/private key pairs. User public/private key pairs sent to and/or stored within protected storage area 120 are protected by encryption/decryption engine 118 and are not directly accessible to server system 104 or its other components.

In server system 104, keys A, B, and C (also referred to as "associated keys") are stored in memory device 105. Key A contains a public key A ("PUKA") and a private key A ("PRKA"), and key A is an associated key that is specifically associated with key 1. Key B includes a public key B ("PUKB") and a private key B ("PRKB"), and key B is an associated key that is particularly associated with key 2. Also, key C contains a public key C ("PUKC") and a private key C ("PRKC"), and key C is an associated key that is associated with key 3. ECK 107 has a public ECK ("PUECK") and a private ECK ("PRECK") and is utilized to encrypt associated key A, B, or C, and associated keys A, B, and C in turn are respectively utilized to encrypt user keys 1, 2, and 3. User keys 1, 2, and 3 encrypt or sign messages sent by users 1, 2, and 3, respectively.

As stated earlier, certification is the process of binding a key, such as a public key or private key, to an individual, organization, entity, or piece of information, such as a permission or credential. A certificate is a collection of information that has been digitally signed by a certificate issuer. A certificate may be established within a client system, such as client system 102A, 102B, or 102C, for a user, such as user 1, 2, or 3, to access a particular application. The certificate may be specifically established for and associated with a particular user and a particular application. The certificate preferably includes a pointer to its associated application, an identity of the user associated with this certificate, and a pointer to the user private key associated with the user of this certificate and application. When an application needs to transmit an encrypted message or to perform an authentication procedure, encryption/decryption engine 118 accesses the user private key pointed to by the application's associated certificate, and then encrypts the message or generates a digital signature utilizing the user private key.

The certificate issuer is a person who issues a key and manages the validity of the key issued to a person, organization, entity, or piece of information. The keys for data processing system 100 are issued by a certificate issuer(s). The certificate issuer manages the validity of the keys by issuing certificates that validate the use of the keys. If a key is to be revoked, then the certificate issuer revokes the key by publishing the certificate for the key on a certificate revocation list. Users 1, 2, and 3 are the certificate users who use the certificates.

Figure 2:
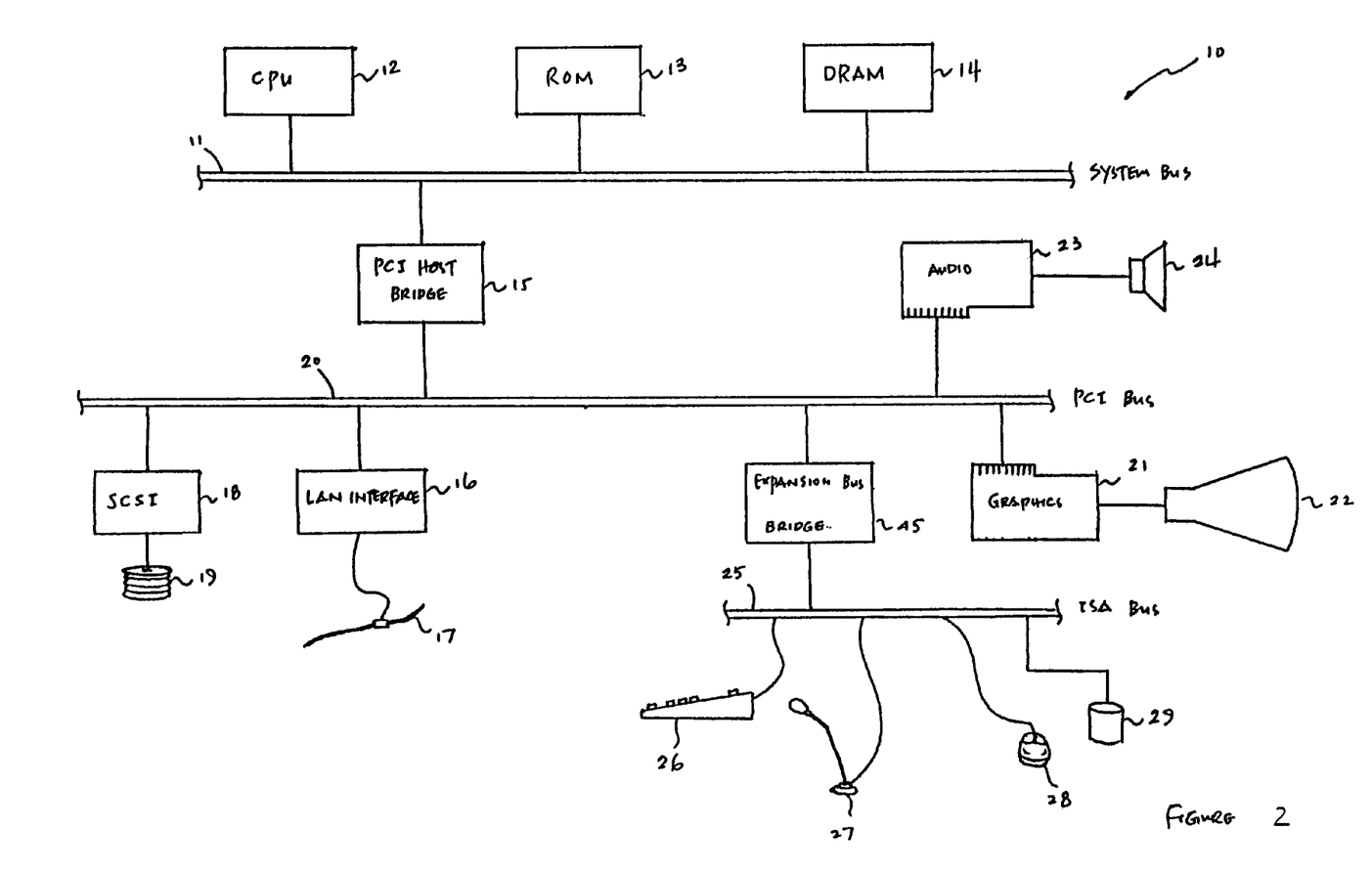
FIG. 2 is an exemplary block diagram of a data processing sub-system, which may be the client system or server system of FIG. 1, that implements the present invention.

Referring now to FIG. 2, a block diagram of a computer system 10, which may be client system 102A, 102B, or 102C or server system 104, in which a preferred embodiment of the present invention is implemented is shown. As shown, a processor (CPU) 12, a read-only memory (ROM) 13, and a random access memory (RAM) 14 are connected to a system bus 11 of a computer system 10. CPU 12 may be CPU 114A, 114B, or 114C for respective client system 102A, 102B, or 102C or may be CPU 116 for server system 104. CPU 12, ROM 13, and RAM 14 are also coupled to a PCI bus 20 of computer system 10 through a PCI host bridge 15. PCI host bridge 15 provides a low latency path through which CPU 12 may directly access PCI devices mapped anywhere within bus memory and/or I/O address spaces. PCI host bridge 15 also provides a high bandwidth path allowing PCI devices to directly access RAM 14.

Also attached to PCI bus 20 is a local-area network (LAN) interface 16 and a small computer system interface (SCSI) 18. LAN interface 16 connects computer system 10 to LAN 17. SCSI 18 is utilized to control a high-speed SCSI disk drive 19. Expansion bus bridge 45, such as a PCI-to-ISA bus bridge, may be utilized to couple an ISA bus 25 to PCI bus 20. As shown, a keyboard 26, a microphone 27, a mouse 28, and a storage device 29 may be attached to ISA bus 25 to perform basic I/O functions. Storage device 29 may be memory system 103A, 103B, or 103C for respective client system 102A, 102B, or 102C or may be memory device 105 for server system 104. In addition, an audio adapter 23 and a graphics adapter 21 may be attached to PCI bus 20. Graphics adapter 21 controls visual output through a display monitor 22 and audio adapter 23 controls audio output through a speaker 24.

Figure 3:
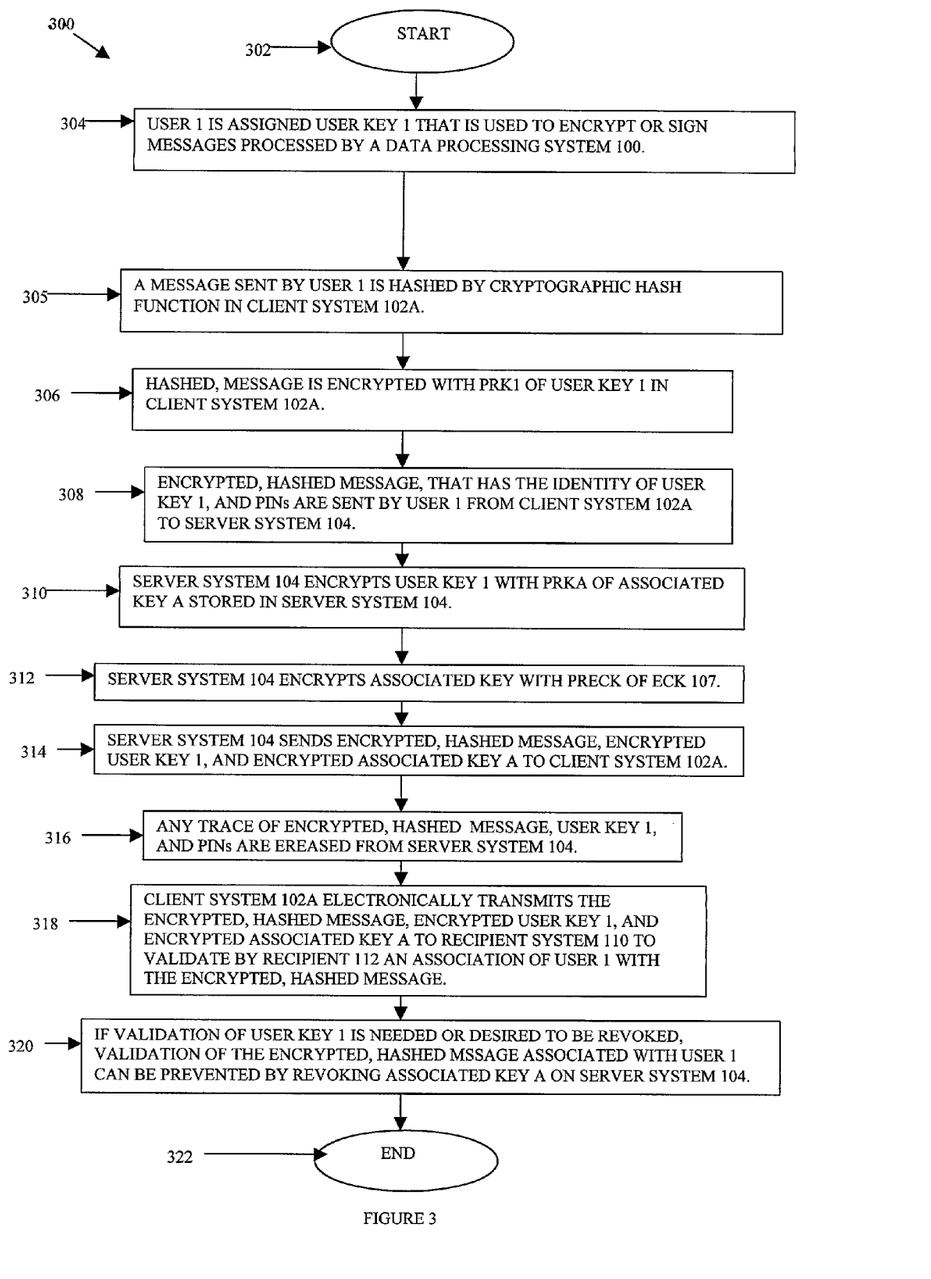
FIG. 3 is a flow chart of an exemplary method and program executed by the data processing system of FIG. 1 for encrypting messages in accordance with the present invention.
Figure 4:
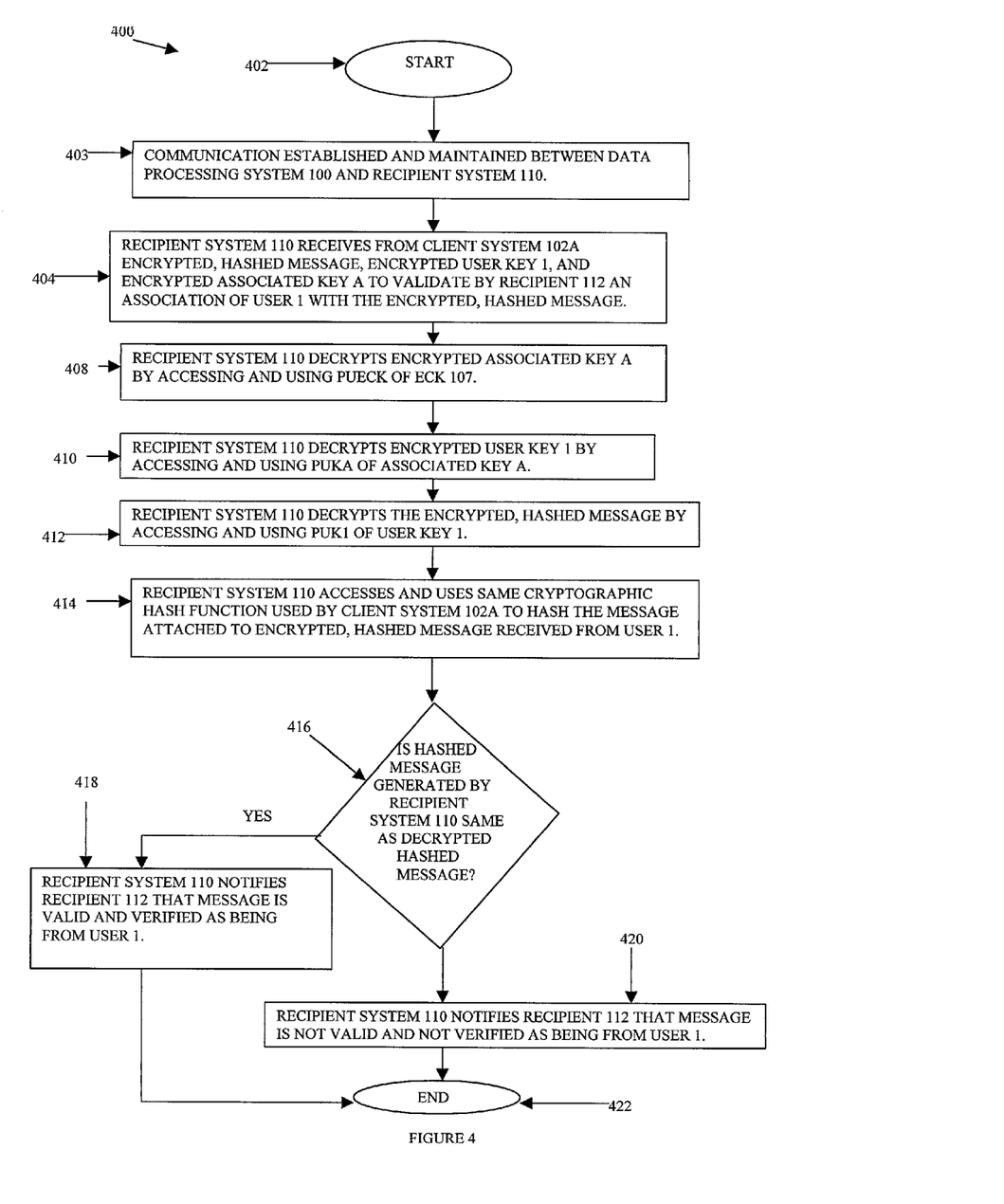
FIG. 4 is a flow chart of an exemplary method and program executed by the data processing system of FIG. 1 for decrypting messages in accordance with the present invention.

With reference now to FIGS. 3 and 4, flow charts of exemplary methods 300 and 400 and programs executed by data processing system 100 for encrypting and decrypting messages in accordance with the present invention are shown. Methods 300 and 400 will be discussed in conjunction with an example for digitally signing a message hashed by a cryptographic function. The hashed message is sent by user 1 and encrypted and decrypted by methods 300 and 400 utilizing user key 1, associated key A, and ECK 107. Methods 300 and 400 are not in any way limited to this exemplary application. Methods 300 and 400 encrypt and decrypt messages in the same manner for users 2 and 3 using user keys 2 and 3, associated keys B and C, and ECK 107. Methods 300 and 400 may be used to encrypt/decrypt any suitable messages.

As shown in FIG. 3, method 300 for encrypting messages in accordance with the present invention starts at block 302. Method 300 next moves to block 304, which illustrates user 1 being assigned user key 1. User 1 uses user key 1 to encrypt or sign messages that are processed by data processing system 100. Following block 304, block 305 shows a message sent by user 1 being hashed by a cryptographic hash function in client system 102A. Method 300 next moves to block 306, which shows that the hashed message is encrypted with user key 1 in client system 102A.

Following block 306, block 308 depicts the hashed message encrypted by PRK1 of user key 1 being sent from client system 102A to server system 104. The encrypted, hashed message includes the identity of user key 1, which is, in effect, transmitted from client system 102A to server system 104 when the encrypted, hashed message is sent. Any personal identification numbers (PINs) or passwords associated with using user key 1 are also sent from client system 102A to server system 104. User key 1 and all associated PINs or passwords, if any, are received and securely maintained within protected storage area 120 of server system 104.

Method 300 then moves to blocks 310, 312, and 314. Block 310 illustrates server system 104 encrypting user key 1 with PRKA of associated key A stored in server system 104. Following block 310, block 312 shows server system 104 encrypting associated key A with PRECK of ECK 107. Method 300 next proceeds to block 314, which depicts server system 104 sending the encrypted, hashed message, encrypted user key 1, and encrypted associated key A to client system 102A.

Method 300 moves from block 314 to block 316, which shows that any trace of the encrypted, hashed message, user key 1, and the associated PINs/passwords are erased from server system 104. Following block 316, block 318 shows client system 102A electronically transmitting the encrypted, hashed message in conjunction with encrypted user key 1 and encrypted associated key A to a recipient system 110. The encrypted message includes the original message. Recipient system 110 receives the encrypted, hashed message (which includes the message of user 1 whether tampered with or not), encrypted user key 1, and encrypted associated key A. Recipient 112 uses recipient system 110 to decrypt the encrypted, hashed message in order to validate an association of user 1 with the encrypted, hashed message.

Method 300 then proceeds to block 320. Block 320 illustrates that if revocation of user key 1 for user 1 is desired (e.g., user 1 is no longer employed at the company maintaining data processing system 100 and validation of user key 1 needs to be revoked), then validation of encrypted, hashed messages associated with user 1 can be prevented by revoking associated key A on server system 104. Associated keys, such as associated keys A, B, and C, are never used outside of server system 104 and are generally only accessed and managed by an authorized system administrator. Associated key A may be revoked by simply erasing it from server system 104. Since associated key A is revoked and no longer exists in server system 104, then ECK 107 does not have an associated key to decrypt, and encrypted user key 1, in turn, cannot be decrypted since associated key A does not exist to decrypt user key 1. Method 300 finally ends at block 322.

In FIG. 4, method 400 for decrypting messages in accordance with the present invention starts at block 402. Method 400 proceeds from block 402 to block 403, which depicts communication being established and maintained between data processing system 100 and recipient system 110. Following block 403, block 404 illustrates recipient system 110 receiving from client system 102A the encrypted, hashed message, encrypted user key 1, and encrypted associated key A. Recipient 112 uses recipient system 110 to validate an association of user 1 with the encrypted, hashed message.

Method 400 then proceeds to blocks 408, 410, and 412. Block 408 represents recipient system 110 decrypting encrypted associated key A by accessing and using PUECK of ECK 107. Block 410 illustrates recipient system 110 decrypting encrypted user key 1 by accessing and using PUKA of associated key A. Block 412 shows recipient system 110 decrypting the encrypted, hashed message by accessing and using PUK1 of user key 1. Method 400 next proceeds to block 414, which depicts recipient system 110 accessing and using the same cryptographic hash function used by client system 102A to hash the message attached to the encrypted, hashed message received from user 1 through client system 102A.

Method 400 then moves to decision block 416, which shows a determination of whether the hashed message generated by recipient system 110 is the same as the decrypted hashed message. If a determination is made at decision block 416 that the hashed messages are the same, then method 400 proceeds from decision block 416 to block 418, which depicts recipient system 110 notifying recipient 112 that the received message is valid and is verified as being sent from user 1. On the other hand, if at decision block 416 the hashed messages are not the same, then method 400 instead proceeds from decision block 416 to block 420, which illustrates recipient system 110 notifying recipient 112 that the received message is not valid and is not verified as being sent from user 1. Method 400 finally ends at block 422.

As has been described, the present invention discloses a system, method, and program for managing a user key used to sign a message for a data processing system having an encryption chip. The present invention helps prevent unauthorized transactions and communications from occurring due to the CRL time-granularity problem. The present invention consolidates the encryption/decryption function at a centralized location. The present invention further discloses use of secure communication and a key revocation scheme to resolve the problems associated with centralizing the encryption/decryption function.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for managing a user key used to sign a message for a data processing system, said method comprising:
    assigning a user key to a user and storing the user key in an encrypting data processing system utilized to encrypt messages;
    encrypting the messages with the user key;
    storing an associated key in the encrypting data processing system and encrypting the user key with the associated key to obtain an encrypted user key, wherein said associated key comprises a private key;
    said encrypting data processing system communicating at least one encrypted message together with the encrypted user key to a recipient system in order to permit validation of an association of the user with the encrypted messages by the recipient system; and
    thereafter, preventing validation of the association of the user with messages by revoking the associated key at the encrypting data processing system so that the encrypting data processing system is no longer able to decrypt the encrypted user key.

2. The method according to claim 1, further comprising:
    decrypting the user key with the associated key; and
    decrypting the messages with the user key.

3. The method according to claim 1, wherein:
    the encrypting data processing system further comprises a client system and a server system coupled for communication, said client system having a client memory device and said server system having an encryption chip and a server memory device;
    storing the user key further comprises storing the user key in the client memory device;
    storing the associated key further comprises storing the associated key in the server memory device; and
    preventing validation further comprises preventing validation of messages associated with the user by eliminating the associated key from the server memory device.

4. The method according to claim 3, wherein encrypting the messages further comprises:
    sending the messages to be encrypted from the client system to the server system;
    encrypting the messages using the encryption chip of the server system; and
    sending the encrypted messages from the server system to the client system.

5. The method according to claim 4, further comprising:
    erasing from the server system all data relating to the encrypted messages after the encrypted messages are sent from the server system to the client system.

6. The method according to claim 1, further comprising:
    encrypting the associated key by using an encryption chip key which is stored on an encryption chip of the encrypting data processing system.

7. The method according to claim 6, further comprising:
    communicating an encrypted associated key to validate the association of the user with the encrypted messages.

8. The method according to claim 7, further comprising: decrypting the associated key with the encryption chip key.

9. A system for managing a user key used to sign a message, said system comprising:
means for assigning a user key to a user;
means for storing the user key;
means for encrypting the messages with the user key;
means for storing an associated key;
means for encrypting the user key with the associated key to obtain an encrypted user key, wherein said associated key comprises a private key;
means for communicating at least one encrypted message together with the encrypted user key to a recipient system in order to permit validation of an association of the user with the encrypted messages by the recipient system; and
means for thereafter preventing validation of the association of the user with messages by revoking the associated key in said system so that the encrypting data processing system is no longer able to decrypt the encrypted user key.

10. The system according to claim 9, further comprising:
means for decrypting the user key with the associated key; and
means for decrypting the messages with the user key.

11. The system according to claim 9, wherein:
the system further comprises a client system and a server system coupled together for communication, said client system having a client memory device and said server system having an encryption chip and a server memory device;
said means for storing the user key further comprises means for storing the user key in the client memory device;
said means for storing the associated key further comprises means for storing the associated key in the server memory device; and
said means for preventing validation further comprises means for preventing the validation of messages associated with the user by eliminating the associated key from the server memory device.

12. The system according to claim 11, wherein said means for encrypting the messages further comprises:
means for sending the messages to be encrypted from the client system to the server system;
means for encrypting the messages using the encryption chip of the server system; and
means for sending the encrypted messages from the server system to the client system.

13. The system according to claim 12, further comprising:
means for erasing from the server system all data relating to the encrypted messages after the encrypted messages are sent from the server system to the client system.

14. The system according to claim 9, further comprising:
an encryption chip that encrypts the associated key by using an encryption chip key stored within the encryption chip.

15. The system according to claim 14, further comprising:
means for communicating an encrypted associated key to validate the association of the user with the encrypted messages.

16. The system according to claim 15, further comprising:
means for decrypting the associated key with the encryption chip key.

17. A program product for managing a user key used to sign a message, said program product comprising:
a control program including:
instruction means for assigning a user key to a user and for storing the user key in an encrypting data processing system utilized to encrypt messages;
instruction means for encrypting the messages with the user key;
instruction means for storing an associated key in the encrypting data processing system and for encrypting the user key with the associated key to obtain an encrypted user key, wherein said associated key comprises a private key;
instruction means for communicating at least one encrypted message together with the encrypted user key to a recipient system in order to permit validation of an association of the user with the encrypted messages by the recipient system;
instruction means for thereafter preventing validation of the association of the user with messages by revoking the associated key within the encrypting data processing system so that the encrypting data processing system is no longer able to decrypt the encrypted user key; and
a computer usable storage medium storing said control program.

18. The program product according to claim 17, further comprising:
instruction means for decrypting the user key with the associated key; and
instruction means for decrypting the messages with the user key.

19. The program product according to claim 17, wherein:
the encrypting data processing system further comprises a client system and a server system coupled together for communication, said client system having a client memory device and said server system having an encryption chip and a server memory device;
said instruction means for storing the user key further comprises instruction means for storing the user key in the client memory device;
said instruction means for storing the associated key further comprises instruction means for storing the associated key in the server memory device; and
said instruction means for preventing validation further comprises instruction means for preventing the validation of the messages associated with the user by eliminating the associated key from the server memory device.

20. The program product according to claim 19, wherein said instruction means for encrypting the messages further comprises:
instruction means for sending the messages to be encrypted from the client system to the server system;
instruction means for encrypting the messages using the encryption chip of the server system; and
instruction means for sending the encrypted messages from the server system to the client system.

21. The program product according to claim 20, further comprising:
instruction means for erasing from the server system all data relating to the encrypted messages after the encrypted messages are sent from the server system to the client system.

22. The program product according to claim 17, further comprising:
  instruction means for encrypting the associated key by using an encryption chip key which is stored on an encryption chip of the data processing system.

23. The program product according to claim 22, further comprising:
  instruction means for communicating an encrypted associated key to validate the association of the user with the encrypted messages.

24. The program product according to claim 23, further comprising:

instruction means for decrypting the associated key with the encryption chip key.

* * * * *